Figure 1:
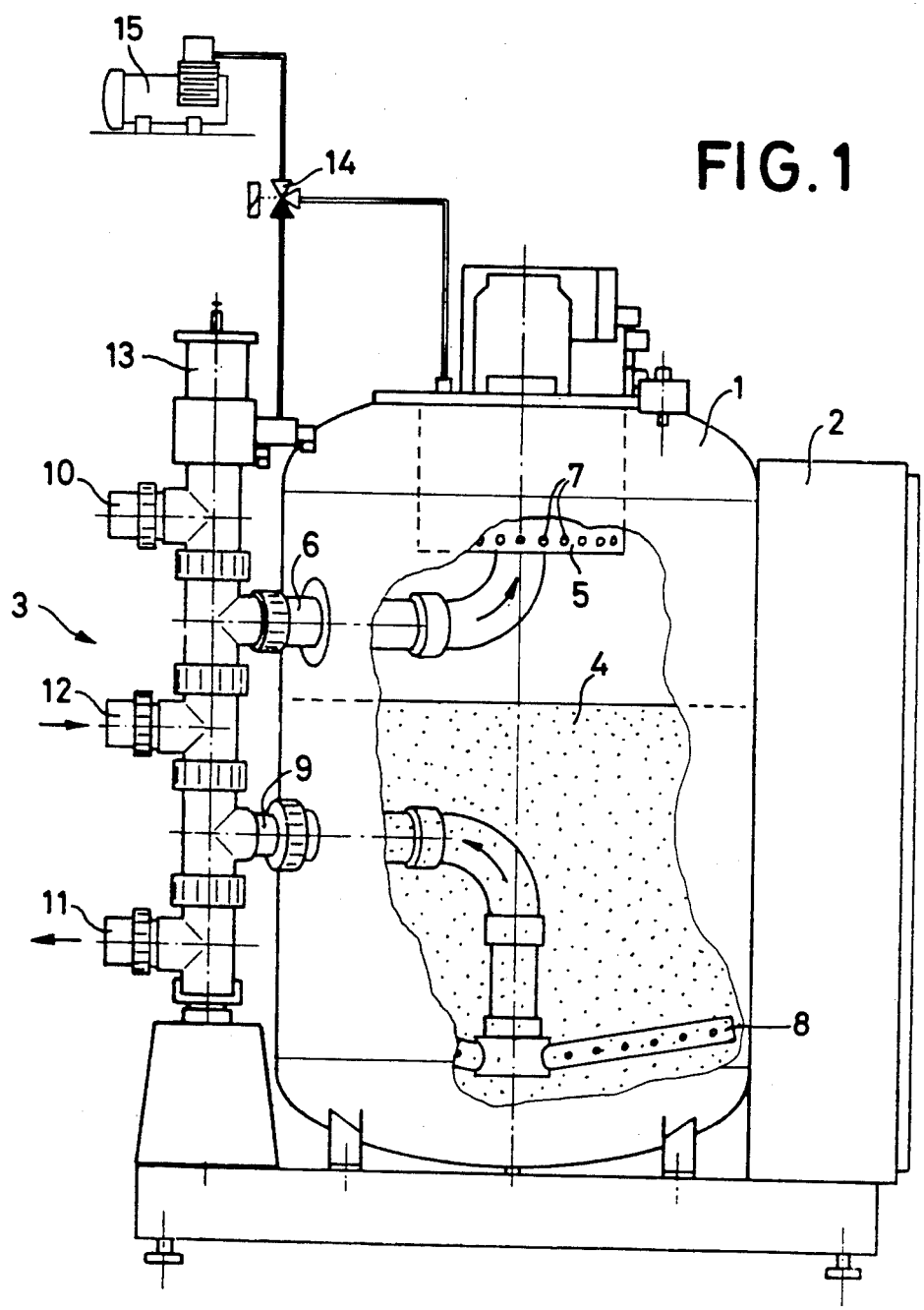

United States Patent

Bachhofer et al.

[11] Patent Number: 4,714,551
[45] Date of Patent: Dec. 22, 1987

[54] 5/2-WAY COMMUTATING VALVE, PARTICULARLY FOR REVERSE-FLUSH FILTERS

[76] Inventors: Bruno Bachhofer, Stäntisstrasse 85, 7981 Bavendorf; Anton Locher, Bergstrasse 6, 7981 Torkenweiler, both of Fed. Rep. of Germany

[21] Appl. No.: 741,164

[22] Filed: Jun. 4, 1985

[30] Foreign Application Priority Data

Jun. 26, 1984 [DE] Fed. Rep. of Germany ....... 3423424

[51] Int. Cl.⁴ .............................................. B01D 23/24
[52] U.S. Cl. ................................ 210/278; 137/625.27; 137/625.66; 210/279; 210/425
[58] Field of Search ...................... 210/169, 421–427, 210/278, 279; 137/596.18, 625.66, 625.27

[56] References Cited

U.S. PATENT DOCUMENTS

| | | | |
|---|---|---|---|
| 582,441 | 5/1897 | Stifel | 210/425 |
| 3,247,967 | 4/1966 | Kucmerosky | 210/422 |
| 3,530,897 | 10/1968 | Buchanan | 137/625.66 X |
| 3,762,443 | 10/1973 | Sorenson | 137/625.66 X |
| 4,043,913 | 8/1977 | Hintermeister | 210/169 |
| 4,491,154 | 1/1985 | Peters | 137/625.66 |

Primary Examiner—Richard V. Fisher
Assistant Examiner—W. Gary Jones
Attorney, Agent, or Firm—Spencer & Frank

[57] ABSTRACT

A 5/2-way commutating valve, particularly for reverse-flush filters in water treatment plants, consists of a tubular housing with five radial pipe connections (6, 9, 10, 11, 12), between which a valve seat (24 to 27) is present in each case. Preferably spherical valve elements (28 to 30) are arranged on a central rod (23) stressed in one direction by a spring arrangement (32), a double-sided value element (29) cooperating with the two central valve seats (25, 26) being slidable longitudinally relative to the central rod (23). The housing is composed of a plurality of mutually rotatable housing parts (16 to 20) each exhibiting a pipe connection. A flow throttle (51, 23) installed between the spigots (9 and 12) in the housing serves to adjust the flow velocity during reverse flushing. A compressed air piston, which is connectable to the compressor of a ozone generator, may be provided to actuate the central rod (23) counter to the spring arrangement (32).

8 Claims, 4 Drawing Figures

5/2-WAY COMMUTATING VALVE, PARTICULARLY FOR REVERSE-FLUSH FILTERS

The invention relates to a 5/2-way commutating valve, particularly for reverse-flush filters in water treatment plants, with a housing, annular valve seats and valve elements which can be applied tightly thereto. In the specific application mentioned, such a valve has the function, in one control position, to direct the stream of water entering from a swimming pool, for example, in a first direction through the filter appliance and then back again to the pool. In the other control position, the flow entering from the same pipe is required to be directed in the opposite direction (reverse-flush direction) through the filter appliance and then into a sewage duct. During the reverse flushing the particles of dirt become detached from the filter gravel and are entrained with the flushing water.

Whereas smaller 5/2-way valves which are constructed as control slide valves present scarcely any structural problems, in water treatment plants with larger pipe cross-sections the described control functions are exercised by individually actuable shut-off valves or three-way valves. Larger pipe cross-sections necessitate disks or similar closure elements which can be applied to corresponding seats. However, if a plurality of closure elements are firmly mutually connected by a common actuating member, then it is necessary for the seats also to have precisely corresponding intervals in order to ensure tight seating. Difficulties arise here, however, in the case of large housings, because material expansions, wear and assembly tolerances also have to be taken into consideration. Furthermore a relief valve valve is also always necessary in order to protect the filter tank.

The underlying object of the invention is to develop a 5/2-way commutating valve for large pipe cross-sections which can be actuated by means of a single adjusting member, which seals perfectly and also performs the function of a relief valve.

This object is achieved according to the invention, starting from a 5/2-way commutating valve of the type initially designated, when the housing is of tubular construction and provided with five radial pipe connections, between which a valve seat is present in each case, and when the valve elements are arranged on a central rod stressed in one direction by a spring arrangement and whilst a double-sided valve element cooperating with the two central valve seats is slidable longitudinally relative to the central rod.

This sliding mobility makes it unnecessary to adhere to unduly close tolerances as regards the intervals of the valve seats. The adjusting drive means of the central rod move the valve elements in both directions, in each case until one of the two outer valve elements comes into tight abutment with the associated valve seat. The central valve element, on the other hand, needs to be moved by the central rod only into a position of light contact with the seat. The water pressure ensures tight application. The commutating valve is therefore self-compensating as regards the valve seat interval.

The generously dimensioned range of the sliding mobility of this central valve element is limited by stops and the valve element is sealed relative to the central rod penetrating it. Consequently the valve element adheres to the central rod and a certain frictional force must be overcome in order to slide it. This is advantageous for the said automatic adjustment of the valve element into its correct limit position.

On the other hand, the sliding mobility of the central valve element makes possible the desired relief valve function. It has already been mentioned that a spring arrangement tends to slide the central rod in one direction. The one outer valve element is pressed against its seat by the spring force. In the case of excessive internal pressure, it may lift by overcoming the spring force. In this case it is essential that the central valve element, upon which the water pressure acts in the opposite direction, does not, due to its sliding mobility, obstruct the movement of the central rod.

Because the pipelines which are connected to such a commutating valve exhibit different spatial arrangements according to conditions in different buildings, it is of great advantage to simplify the assembly in that the housing is composed of a plurality of housing parts which each exhibit a pipe connection and are mutually rotatable relative to the longitudinal axis of the housing. This may be achieved, for example, in that the housing parts are connected mutually by customary pipe screw fittings. The pipe connections can thus be adjusted into any desired direction.

As regards the construction of the closure arrangements, it has been found convenient if spherical valve elements and valve seat rings of rounded cross-section consisting of a resilient material are provided. A ball is particularly suitable for the central valve element because a ball can cooperate on two sides with small-diameter valve seat rings. The seat diameter is, for example, 85% of the ball diameter.

The flow velocity of the reverse flushing water is of strict importance for the reverse flushing of sand filters or mixed bed filters. On the one hand, it should be as high as possible in order to remove the attached dirt thoroughly and rapidly. However, on the other hand the filter grains should not be washed out. It is therefore important that the filter constituents raised farthest by the reverse flushing water cannot possibly rise above the existing freeboard height. For this reason an adjustable flow throttle constructed as a separate fitting is customarily installed in the reverse flushing feed pipe to the filter tank, so that it is inoperative or by-passed in the inverse flow direction during filter service, and consequently does not obstruct this substantially more intense flow. This problem also rendered the development of a compact 5/2-way commutating valve substantially more difficult.

It is therefore proposed as a further development of the invention that a flow throttle is installed in the housing of the commutating valve itself between the connection of the feed pipe and the connecting pipe of the collector of a filter bed. It should be constituted such that it can be adjusted easily. A particular fitting and its pipe system can therefore be omitted.

With a view to a convenient and operationally reliable remote control of the commutating valve, it is proposed that a piston stressable by compressed air is provided to actuate the central rod counter to the spring arrangement. It may particularly be sealed by means of a rolling membrane. Such a pneumatic control device can be used to quite particular advantage in combination with an ozone generator which is installed in a gravel filter tank and exhibits a compressor for its compressed air requirement. In this case it is proposed that the compressor is also used alternately to actuate the commutating valve. This is possible because, in the case of such a water treatment plant as is explained below, during the reverse flushing operation the ozone generator is switched off and the compressor is therefore available. However, the advantage lies not only in the economy of a compressor, but in the functional interlocking thereby achieved. So long as the ozone generator is operating it is impossible for the valve to commutate, and when commutation to reverse flushing operation has been effected, no ozone is generated.

Figure 2:
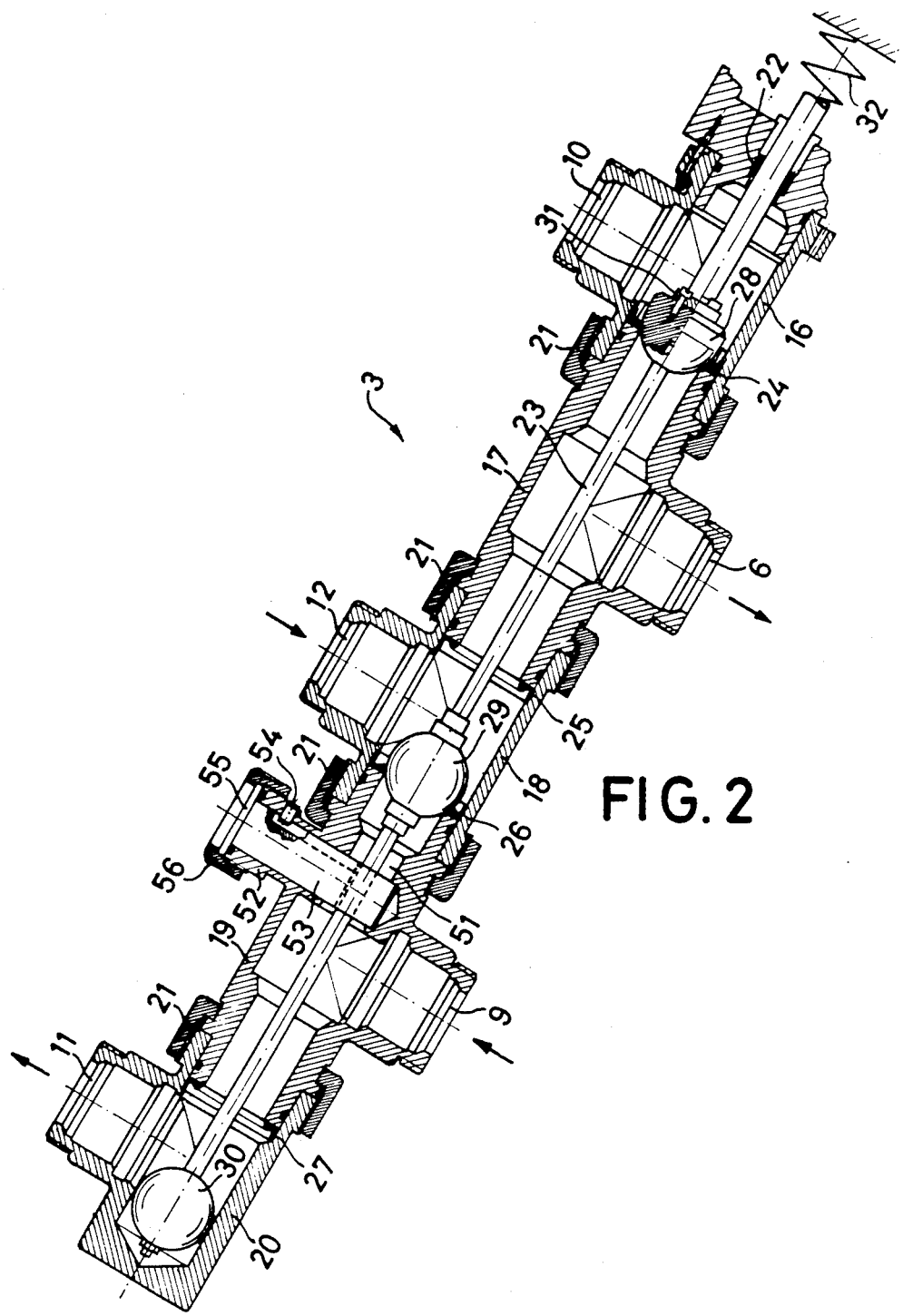
Figure 4:
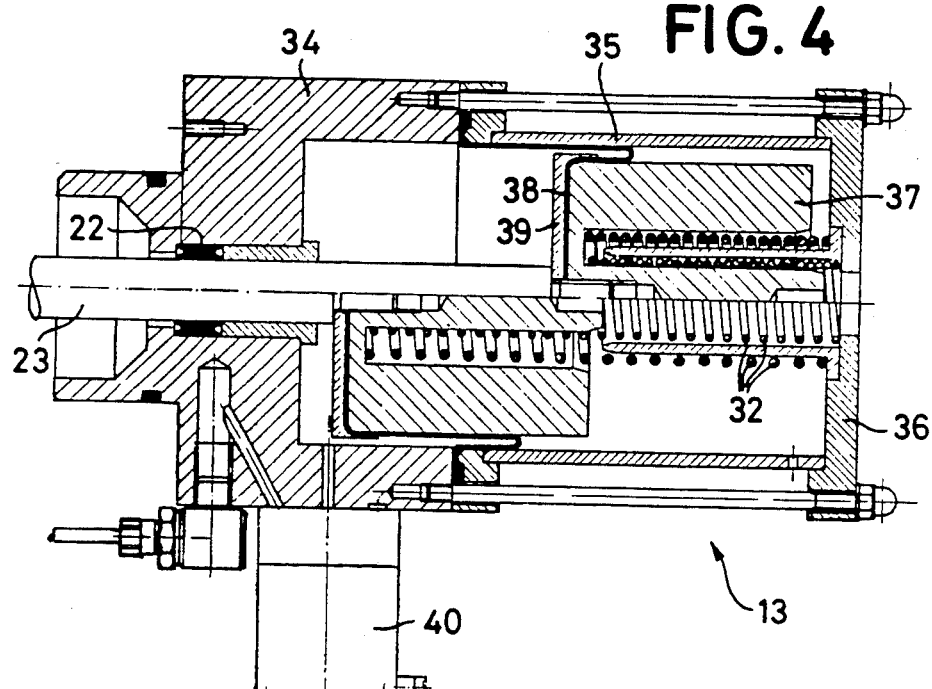
Figure 3:
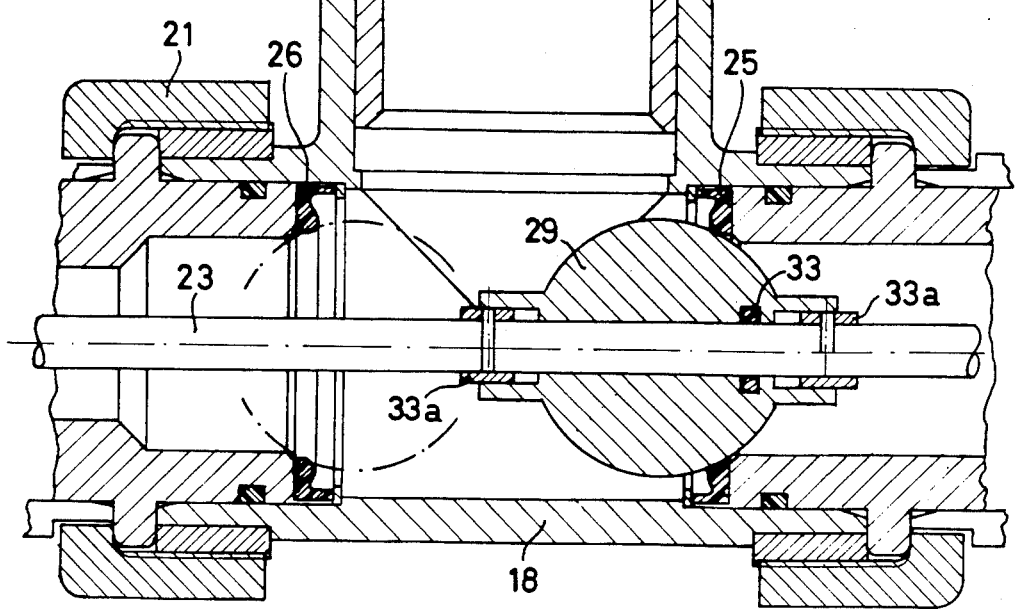

An example of construction of the invention is described below with reference to the drawing, wherein specifically, FIG. 1 shows a partially diagrammatic elevation of a water treatment device with a gravel filter and with an ozone generator, FIG. 2 shows a longitudinal section of the 5/2-way commutating valve according to FIG. 1, FIG. 3 shows the central part of the commutating valve according to FIG. 2 on a larger scale, and FIG. 4 shows a longitudinal section through the pneumatic drive means of the commutating valve.

The water treatment device according to FIG. 1 comprises, on a foundation, an upright filter tank 1, a control cabinet 2 and a 5/2-way commutating valve 3. The designation "5/2" means five connections and two control positions. The tank is filled to approximately one half with fine quartz gravel 4 and contains, in its upper part, an ozone generator 5 which is combined with a mixer. The water enters this unit through a connecting pipe 6 and leaves it through orifices 7 at its lower edge into the tank. The water forced through the filter layer is collected by star pipes 8 and passed outside through a connecting pipe 9. A transformer and other auxiliary units of this device are located on the filter tank 1.

The 5/2-way commutating valve 3 consists substantially of five T-shaped housing parts, which are connected mutually by screw fittings. Each housing part has a pipe connection. Two of the latter are connected to the connecting pipes 6 and 9 of the filter tank. A pipe leading to the sewage duct is connected at 10, and a return pipe to a swimming pool at 11. A feed pipe subject to pump pressure is connected at 12. The upper end of the 5/2-way commutating valve 3 forms the pneumatic drive device 13. It is in communication with a compressor 15 via a three-way valve 14. A further compressed air pipe connects the threeway valve 14 to the ozone generator 5.

In FIG. 2 the five connections of the commutating valve are designated by the same reference numerals as in FIG. 1 for ease of reference. This figure further shows the five individual housing parts 16 to 20, which are mutually connected by means of screw rings 21 and are therefore mutually rotatable as required during assembly. The bottom housing part 20 is closed at the end face, the top housing part 16 exhibits a seal element 22 through which a central rod 23 is introduced into the housing. Four bulging valve seat rings 24 to 27, consisting of a strong resilient sealing material, are inserted into the housing parts 16, 18 and 20 and cooperate with spherical valve elements 28 to 30. The valve elements 28 and 30 are attached to the central rod, but the valve element 29 is longitudinally slidable, as FIG. 3 shows more clearly. The valve element 29 has only a hemispherical shape and is adjustable in the longitudinal direction relative to the central rod 23 by means of a screw arrangement 21.

In the rest position illustrated in FIG. 2, which corresponds to the filter operation, the central rod 23 is subject to the influence of a spring arrangement 32, only indicated diagrammatically here, which maintains the valve elements 28 and 29 in abutment with the valve seat rings 24 and 26.

On its side facing the feed pipe 12, the housing part 19 exhibits a constriction 51 and a small radial spigot 52. A throttle bolt 53, which is inserted into this spigot, exhibits a transverse slit on its inner end face and therefore encloses the central rod 23 bifurcately. So that the throttle bolt 53 cannot rotate and is always inserted correctly, it also has a longitudinal groove into which a transverse pin 54 of the spigot 52 projects. By a flange 55, the throttle bolt abuts and seals against the rim of the spigot and is retained by means of a screw ring 56.

The flow throttle formed by this arrangement is operative only when the commutating valve occupies the control position not shown, that is to say the connections 12 and 9 are mutually connected. The flow resistance is coordinated with a quite specific filter tank. If it is proposed to use the commutating valve in combination with larger filter tanks, then a correspondingly shorter throttle bolt is inserted, whereby the flow resistance is reduced.

The fully spherical valve element 29 is illustrated in section in FIG. 3. It slides on the central rod 23 and is sealed relative thereto by means of an O-ring 33. Its longitudinal mobility is limited by stop rings 33a attached to the central rod 23. Upon commutation the central rod 23 entrains the valve element 29, in the position which it originally occupied relative to this rod, to the opposite valve seat ring, and it can abut the latter tightly under the prevailing water pressure irrespectively of the precise position of the central rod 23.

In the position of the valve according to FIG. 2, which corresponds to filter operation (chain-dotted lines in FIG. 3), the valve element 28 acts as a relief valve. Excess pressure may occur, for example, if the pressure of a circulating pump is applied incorrectly to the connection 12, particularly if the filter bed is already largely clogged with dirt. The valve element 28 can then lift itself from its valve seat ring 24, counter to the force of the spring arrangement 32, also moving the central rod 23. However, the latter is not obstructed in this movement by the valve element 29 retained on its valve seat ring 26 by the same pressure.

FIG. 4 shows the drive device 13 of the commutating valve, and also the spring arrangement 32 consisting of two concentric helic springs, each having one half in both control positions. A cylinder housing consisting of a base part 34, a cylinder 35 and a cover 36, is screwed onto the housing part 16. A piston 37, which is braced against the cover 36 via the spring arrangement 32 mentioned, is attached to the overhanging end of the central rod 23. A rolling membrane 38 is clamped between a disk 39 and the piston 37 on the one hand, and between the cylinder 35 and the base part 34 on the other hand. A solenoid-controllable three-way valve 40 connects the compressed air pipe entering from the three-way valve 14 to the interior space of the cylinder, and vents the latter in its rest position.

The 5/2-way commutating valve described and the water treatment device illustrated in FIG. 1 operate as follows: During normal service (filter operation) the water entering from a swimming pool is mixed intensively with ozone, filtered and returned to the pool. The compressor 15 supplies compressed air for the ozone generator. The drive device 13 is in the rest position, that is to say the spring arrangement 32 forces the central rod 23 downwards. The stream of water passes from the connection 12 through the pipe 6 to the ozone generator and mixer 5, then through the gravel bed 4 and through the star pipes 8 and the pipe 9 back to the connection 11 and to the pool.

The reverse-flush process is commenced by switching off the ozone generator 5 and commutating both the three-way valves 14 and 40. The air pressure now stresses the piston 37 and carries the central rod 23 upwards counter to the spring arrangement 32. The pressurised water therefore passes from the connection 12 via the throttle position 51, 53 and the pipe 9 to the star pipes 8 and rises through the gravel bed 4 from beneath. The quartz granules become loosened and move and the dirt particles retained between them are therefore washed out. The water now enters through the orifices 7 of the mixer housing and flows through the latter and the pipe 6 in the opposite direction. This pipe is now connected to the connection 10, from where the dirty water passes into the sewage duct. After a reverse-flush period determined empirically, a further commutation is made and the normal operation with ozone feed is continued.

List of Reference Numeral

| | |
|---|---|
| 1 filter tank | 21 screw ring |
| 2 control cabinet | 22 seal element |
| 3 5/2-way commutating valeve | 23 central rod |
| 4 quartz gravel | 24 valve seat ring |
| 5 ozone generator | 25 valve seat ring |
| 6 connection pipe | 26 valve seat ring |
| 7 orifice | 27 valve seat ring |
| 8 star pipe | 28 valve element |
| 9 connection pipe | 29 valve element |
| 10 sewage duct | 30 valve element |
| 11 return pipe | 31 screw arrangement |
| 12 feed pipe | 32 spring arrangement |
| 13 drive device | 33 O-rings |
| 14 three-way valve | 33a stop ring |
| 15 compressor | 34 base part |
| 16 housing part | 35 cylinder |
| 17 housing part | 36 cover |
| 18 housing part | 37 piston |
| 19 housing part | 38 rolling membrane |
| 20 housing part | 39 disk |
| | 40 three-way valve |
| | 51 constriction |
| | 52 spigot |
| | 53 throttle bolt |
| | 54 transverse pin |
| | 55 flange |
| | 56 screw ring |

We claim:

1. A 5/2-way commutating valve comprising:
an elongate housing having a longitudinal axis, opposed ends, a hollow interior extending along the longitudinal axis between said ends and five connecting members spaced apart along the longitudinal axis and each having a flow passage communicating with said hollow interior and extending transversely of the longitudinal axis;
means defining a plurality of annular valve seats disposed in said hollow interior, with each said valve seat being located between a respective pair of connecting members;
a central rod located in, and extending along, said hollow interior and movable along the longitudinal axis of said housing;
spring means operatively associated with said central rod for urging said central rod in a selected direction along the longitudinal axis of said housing;
first and second valve elements each mounted on said central rod in the vicinity of a respective end of said housing and each located to form a sealing connection with a respective valve seat; and
a double-sided valve element carried by said central rod at a location between said first and second valve elements and movable with said central rod between respective positions to form, in each of the respective positions, a sealing connection with a respective one of two of said valve seats, said double-sided valve element being mounted to said central rod to have a limited mobility along the longitudinal axis relative to said central rod.

2. A valve as defined in claim 1 wherein said housing comprises a plurality of housing parts each having only a single respective one of said connecting members, and said housing parts are rotatable relative to one another about the longitudinal axis of said housing.

3. A valve as defined in claim 1 wherein each said valve element and valve seat has a portion in the form of part of a sphere and each said valve seat is made of a resilient material.

4. A valve as defined in claim 1 wherein a first one of said connecting members is a feed pipe connection and a second one of said connecting members is a connecting pipe for a collector of a filter bed, and further comprising flow throttling means disposed in said hollow interior between said first and second connecting members.

5. A valve as defined in claim 4 connected to a reverse-flush filter of a water treatment plant.

6. A valve as defined in claim 1 in combination with a pneumatically actuatable piston connected to said central rod for displacing said central rod along the longitudinal axis of said housing in opposition to said spring means.

7. A valve as defined in claim 6 in combination with a filter tank, an ozone generator in said tank, a compressor connected for supplying compressed air to the ozone generator, and means connecting said compressor to said piston for permitting said piston to be selectively actuated by compressed air supplied by said generator.

8. A valve as defined in claim 7 wherein said connecting means are constructed for supplying compressed air from said compressor to only a selected one of said ozone generator and said piston.

* * * * *